United States Patent
Ikeda et al.

(10) Patent No.: US 7,802,178 B2
(45) Date of Patent: Sep. 21, 2010

(54) INFORMATION DISPLAY APPARATUS, INFORMATION DISPLAY METHOD, INFORMATION DISPLAY PROGRAM, GRAPHICAL USER INTERFACE, MUSIC REPRODUCTION APPARATUS, AND MUSIC REPRODUCTION PROGRAM

(75) Inventors: Takuo Ikeda, Tokyo (JP); Nobuki Furue, Tokyo (JP); Wataru Tajika, Tokyo (JP); Takashi Kitao, Tokyo (JP); Yuhei Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 875 days.

(21) Appl. No.: 11/625,077

(22) Filed: Jan. 19, 2007

(65) Prior Publication Data

US 2007/0176922 A1 Aug. 2, 2007

(30) Foreign Application Priority Data

Jan. 27, 2006 (JP) ............................. 2006-019289

(51) Int. Cl.
*G06F 17/21* (2006.01)
(52) U.S. Cl. .................................. 715/227; 715/784
(58) Field of Classification Search ......... 715/227–228, 715/821–824, 817–820
See application file for complete search history.

(56) References Cited

U.S. PATENT DOCUMENTS

| | | | | | |
|---|---|---|---|---|---|
| 4,862,390 | A | * | 8/1989 | Weiner | 715/822 |
| 5,265,202 | A | * | 11/1993 | Krueger et al. | 715/797 |
| 5,339,391 | A | * | 8/1994 | Wroblewski et al. | 345/607 |
| 5,479,600 | A | * | 12/1995 | Wroblewski et al. | 715/787 |
| 5,550,969 | A | * | 8/1996 | Torres et al. | 715/787 |
| 5,745,111 | A | * | 4/1998 | Cline et al. | 715/769 |
| 5,760,773 | A | * | 6/1998 | Berman et al. | 715/808 |
| 5,874,961 | A | * | 2/1999 | Bates et al. | 715/786 |
| 6,147,683 | A | * | 11/2000 | Martinez et al. | 715/786 |
| 6,446,080 | B1 | * | 9/2002 | Van Ryzin et al. | 707/104.1 |
| 6,476,831 | B1 | * | 11/2002 | Wirth et al. | 715/784 |
| 7,600,192 | B1 | * | 10/2009 | Hashimoto et al. | 715/802 |
| 2001/0009420 | A1 | * | 7/2001 | Kamiwada et al. | 345/629 |
| 2001/0043198 | A1 | * | 11/2001 | Ludtke | 345/173 |
| 2003/0206199 | A1 | * | 11/2003 | Pusa et al. | 345/794 |
| 2004/0100479 | A1 | * | 5/2004 | Nakano et al. | 345/700 |
| 2004/0119742 | A1 | * | 6/2004 | Silbey et al. | 345/760 |
| 2005/0091604 | A1 | * | 4/2005 | Davis | 715/772 |

(Continued)

FOREIGN PATENT DOCUMENTS

JP 2004-335098 11/2004

(Continued)

OTHER PUBLICATIONS

Bunzei, Easy Digital Music, Aug. 18, 2004, Que, pp. 98-101.*

(Continued)

*Primary Examiner*—Doug Hutton
*Assistant Examiner*—Frank D Mills
(74) *Attorney, Agent, or Firm*—Oblon, Spivak, McClelland, Maier & Neustadt, L.L.P.

(57) ABSTRACT

Disclosed herein is an information display apparatus includes: candidate object display means configured to display selectable candidate objects in a first display layer; and selected object display processing means configured to display a selected object, which is selected by user from the candidate objects, in a second display layer, which is superposed over the first display layer.

19 Claims, 7 Drawing Sheets

U.S. PATENT DOCUMENTS

| | | | |
|---|---|---|---|
| 2005/0114351 A1* | 5/2005 | Yano et al. | 707/10 |
| 2005/0210403 A1* | 9/2005 | Satanek | 715/786 |
| 2005/0262450 A1* | 11/2005 | Sauermann | 715/784 |
| 2006/0195438 A1* | 8/2006 | Galuten | 707/4 |
| 2006/0253782 A1* | 11/2006 | Stark et al. | 715/727 |
| 2006/0267995 A1* | 11/2006 | Radloff et al. | 345/530 |
| 2006/0271870 A1* | 11/2006 | Anwar | 715/764 |
| 2007/0028183 A1* | 2/2007 | Ostojic et al. | 715/768 |
| 2007/0198476 A1* | 8/2007 | Farago et al. | 707/3 |

FOREIGN PATENT DOCUMENTS

| | | | |
|---|---|---|---|
| WO | WO-03/058625 A1 * | 7/2003 | |

OTHER PUBLICATIONS

Kelby, The Ipod Book: Doing Cool Stuff With the Ipod and the Itunes Music Store, Oct. 25, 2005, Peachpit Press, 2nd Edition, pp. 133-135.*

U.S. Appl. No. 11/623,938, filed Jan. 17, 2007, Ikeda, et al.

* cited by examiner

FIG.5

| Playlist | Track name | Time | Artist | Album name | Genre |
|---|---|---|---|---|---|
| ALL | Dream Gypsy | 9:16 | Bill Evans | Waltz for Debby | Jazz |
| Rock | Speak | 7:02 | Bill Evans | Waltz for Debby | Jazz |
| Cool | Waltz for Debby | 4:11 | Bill Evans | Waltz for Debby | Jazz |
| 103B | Dream Gypsy | 9:16 | Bill Evans | Waltz for Debby | Jazz |
| 103C | Iong | 7:02 | Bill Evans | Waltz for Debby | Jazz |

FIG.6

| Playlist | Track name | Time | Artist | Album name | Genre |
|---|---|---|---|---|---|
| ALL | Waltz for Debby | 4:11 | Bill Evans | Waltz for Debby | Jazz |
| Rock | Dream Gypsy | 9:16 | Bill Evans | Waltz for Debby | Jazz |
| Cool | Iong | 7:02 | Bill Evans | Waltz for Debby | Jazz |
| 103B | Music01 | 5:16 | test | sound test | Rock |
| 103C | Music02 | 3:36 | test | sound test | Rock |

SCROLL UPWARD

FIG.10

| Playlist | Track name | Time | Artist | Album name | Genre |
|---|---|---|---|---|---|
| ALL | Waltz for Debby | 4:11 | Bill Evans | Waltz for Debby | Jazz |
| Rock | Dream Gypsy | 9:16 | Bill Evans | Waltz for Debby | Jazz |
| Cool | Iong | 7:02 | Bill Evans | Waltz for Debby | Jazz |
| | Music01 | 5:16 | test | sound test | Rock |
| | Music02 | 3:36 | test | sound test | Rock |

INFORMATION DISPLAY APPARATUS, INFORMATION DISPLAY METHOD, INFORMATION DISPLAY PROGRAM, GRAPHICAL USER INTERFACE, MUSIC REPRODUCTION APPARATUS, AND MUSIC REPRODUCTION PROGRAM

CROSS REFERENCES TO RELATED APPLICATIONS

The present invention contains subject matter related to Japanese Patent Application JP 2006-019289 filed in the Japanese Patent Office on Jan. 27, 2006, the entire contents of which being incorporated herein by reference.

BACKGROUND OF THE INVENTION

1. Field of the Invention

The present invention relates to an information display apparatus, information display method, information display program, graphical user interface, music reproduction apparatus, and music reproduction program, and is suitable for applications where a plurality of objects are presented for user selection.

2. Description of the Related Art

An image-information-type graphical user interface (GUI) has been widely used as a display interface for computer operations. Since the GUI displays a GUI screen and uses icons (visual representations, graphic symbols, etc.) as well as text to represent the contents of files, functions, and operations, it permits a user to perform visual, intuitive operations and provides higher user-friendliness than a textual-information-type character user interface (CUI).

The GUI screen generally offers multiwindow capability, which simultaneously displays a plurality of windows, thereby allowing the user to perform a plurality of operations in a parallel manner.

A list display mode is widely used in the GUI screen to let the user select a desired selectable object from a plurality of candidate objects. The list display mode simultaneously presents a plurality of candidate objects to the user by arranging the information about candidate object files and pieces of content (e.g., icons and names) in a vertical or horizontal direction within a list display section.

In the list display mode, a selected candidate object by user (that is, the selected object) is displayed in a manner different from the manner in which the other candidate objects are displayed in the list display section (e.g., by changing the display color). This makes it possible to visually distinguish the selected object from the candidate objects.

The list display mode also scrolls the contents displayed in the list display section in a vertical or horizontal direction depending on a user operation. This makes it possible to sequentially display hidden candidate objects that are currently positioned outside a display range of the list display section.

SUMMARY OF THE INVENTION

When the list display section is scrolled, the selected object moves together with the candidate objects. Therefore, the selected object disappears from the list display section so that the user may not confirm the already selected object.

The present invention has been made in view of the above circumstances, and proposes an information display apparatus, information display method, information display program, graphical user interface, music reproduction apparatus, and music reproduction program that provide increased ease of operation.

According to an embodiment of the present invention, there is provided an information display apparatus includes: candidate object display means configured to display selectable candidate objects in a first display layer; and selected object display processing means configured to display a selected object, which is selected by user from the candidate objects, in a second display layer, which is superposed over the first display layer.

According to another embodiment of the present invention, there is provided an information display method including the steps of: displaying selectable candidate objects in a first display layer; and displaying a selected object, which is selected by user from the candidate objects, in a second display layer, which is superposed over the first display layer.

According to yet another embodiment of the present invention, there is provided an information display program that causes an information processing apparatus to execute the steps of: displaying selectable candidate objects in a first display layer; and displaying a selected object, which is selected by user from the candidate objects, in a second display layer, which is superposed over the first display layer.

According to further embodiment of the present invention, there is provided a graphical user interface that presents selectable candidate objects and allows a user to select an object from the candidate objects, the graphical user interface including the steps of: displaying the candidate objects in a first display layer; and displaying a selected object, which is selected by user from the candidate objects, in a second display layer, which is superposed over the first display layer.

According to yet further embodiment of the present invention, there is provided a music reproduction apparatus includes: candidate object display means configured to display selectable candidate objects in a first display layer; selected object display processing means configured to display a selected object, which is selected by user from the candidate objects, in a second display layer, which is superposed over the first display layer; playlist creation means configured to create a playlist in accordance with selected objects displayed in the second display layer; and reproduction means configured to reproduce music in accordance with the playlist.

According to another embodiment of the present invention, there is provided a music reproduction program that causes a music reproduction apparatus to execute the steps of: displaying selectable candidate objects in a first display layer; displaying a selected object, which is selected by user from the candidate objects, in a second display layer, which is superposed over the first display layer; creating a playlist in accordance with selected objects displayed in the second display layer; and reproducing music in accordance with the playlist.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a schematic diagram illustrating a playlist creation procedure;

FIG. 6 is a schematic diagram illustrating a playlist creation procedure;

FIG. 10 is a schematic diagram illustrating a playlist creation procedure; and

DETAILED DESCRIPTION OF THE PREFERRED EMBODIMENTS

The embodiments of the present invention will now be described in detail with reference to the accompanying drawings.

(1) Personal Computer Configuration

Figure 1:
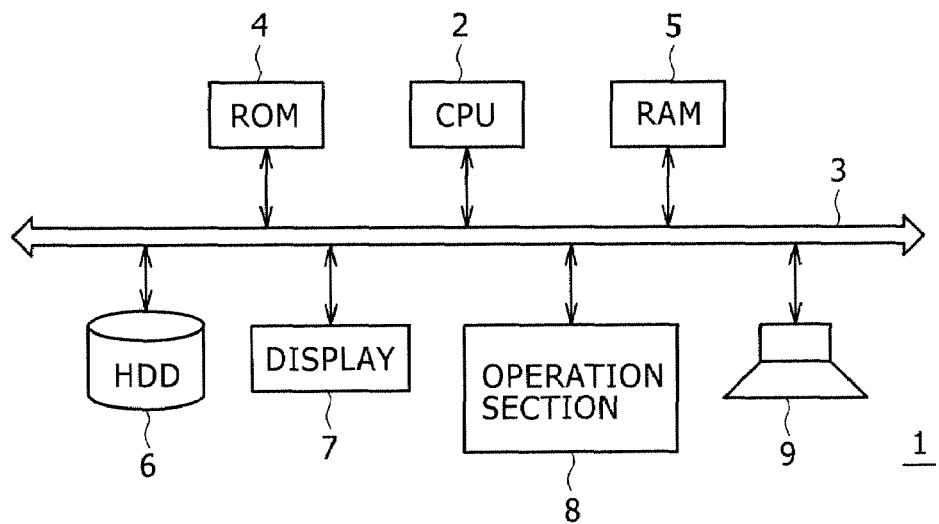
FIG. 1 is a block diagram illustrating the hardware configuration of a personal computer.

FIG. 1 shows the configuration of a personal computer 1, which is used as an information display device and music reproduction apparatus that implements a graphical user interface according to an embodiment of the present invention. The personal computer 1 includes a CPU (Central Processing Unit) 2, which provides overall control. The CPU 2 is connected via a bus 3 to a ROM (Read Only Memory) 4, a RAM (Random Access Memory) 5, a hard disk drive 6, a display 7, an operation section 8, and a speaker 9. In reality, the operation section 8 includes a keyboard and a mouse.

The hard disk drive 6 stores a base program (operating system) and various application programs. When the personal computer 1 starts up, the CPU 2 reads the base program from the hard disk drive 6 and executes the base program in the RAM 5. Further, under the control of the base program, the CPU 2 reads an appropriate application program from the hard disk drive 6 in accordance with a user operation, which is input from the operation section 8, executes the read application program in the RAM 5, and displays the resulting processing results on the display 7.

(2) List Display Method According to an Embodiment of the Present Invention

(2-1) Music Player Configuration

A music player is cited as an example to describe a list display method according to an embodiment of the present invention. The list display method according to an embodiment of the present invention can be applied to various list display screens such as a display screen for a file management program and file selection screens for various programs. However, the description given below relates to a case where the present invention is applied to a music player, which reproduces musical content (hereinafter referred to as songs), and a list display mode is used for allowing the user to select desired songs and create a playlist. The music player starts running when a music player program, which is an application program for music reproduction and information display, is read from the hard disk drive 6 and executed in the RAM 5 by the CPU 2.

Figure 2:
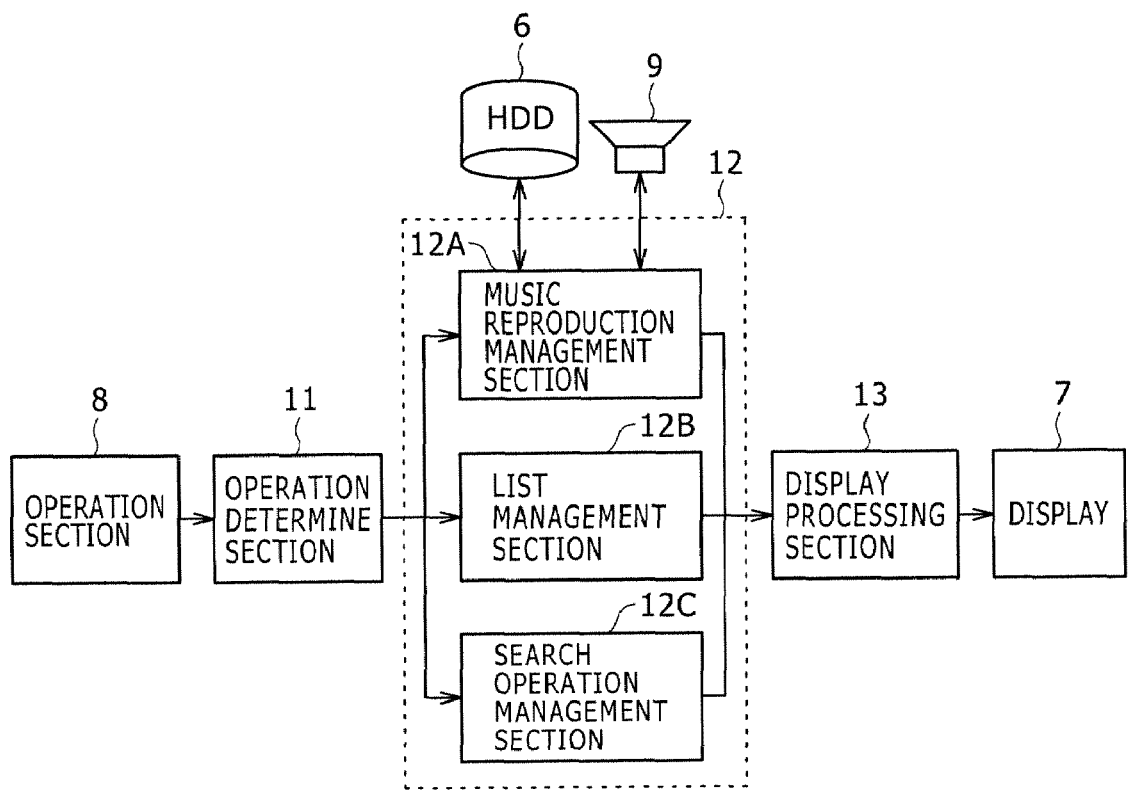
FIG. 2 is a block diagram illustrating the software configuration of a music player.

As shown in FIG. 2, the music player program causes an operation determine section 11 to receive an input signal S1 from the user via the mouse or keyboard in the operation section 8, generate various operation signals S2 corresponding to the input signal S1, and supply the generated operation signals to an operation execution section 12.

The operation execution section 12 includes a music reproduction management section 12A, a list management section 12B, and a search operation management section 12C. These management sections operate in accordance with the operation signals S2. For example, the music reproduction management section 12A, configured to as a reproduction section, reproduces musical content stored on the hard disk drive 6 in accordance with various music reproduction procedures performed by the user, such as a reproduction procedure, outputs the reproduced content from the speaker 9, and transmits reproduction-related display information to a display processing section 13.

The list management section 12B, configured to as a playlist creation section, performs a playlist creation, deletion, or other process in accordance with various listing operations performed by the user for musical content listing, playlist creation, and the like, and transmits the process-related display information to the display processing section 13. For example, the list management section 12B temporarily stores a selected object by user in the RAM 5, generates display information for displaying the selected object in a three-dimensional display mode, which uses a plurality of layers as described later, and transmits the generated display information to the display processing section 13. Further, when the user inputs an instruction for deleting a selected object, the list management section 12B erases the selected object from the RAM 5 and transmits display information for changing the display of the selected object in the three-dimensional display mode. Furthermore, when the user inputs an instruction for creating a playlist, the list management section 12B creates the playlist in accordance with the selected object stored in the RAM 5 and transmits to the display processing section 13 the display information for displaying the creation of the playlist with a plurality of layers in the three-dimensional display mode.

The search operation management section 12C searches for musical content stored on the hard disk drive 6 in accordance with a user's musical content search operation, and transmits display information about the result of the search to the display processing section 13.

In accordance with the display information supplied, for instance, from the music reproduction management section 12A, list management section 12B, and search operation management section 12C, the display processing section 13 determines the contents to be three-dimensionally displayed with a plurality of layers, which will be described later, generates a video signal S3 for the contents to be displayed, and displays the generated video signal S3 on the display 7.

(2-2) Music Player Screen Configuration

Figure 3:
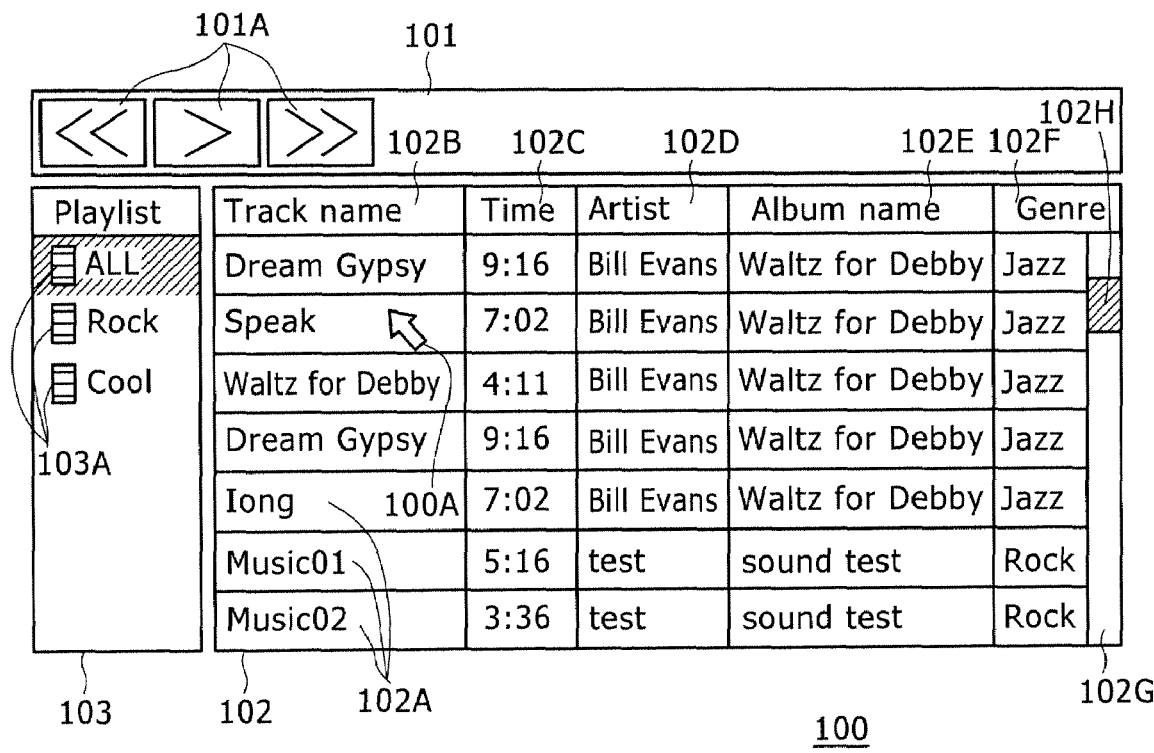
FIG. 3 is a schematic diagram illustrating the screen configuration of the music player.

FIG. 3 shows the configuration of a main screen 100 that is to be displayed on the display 7 by the music player. A toolbar 101 is displayed at the top of the screen. A list display section 102 is displayed in the lower right-hand area below the toolbar 101. Further, a playlist display section 103 is displayed to the left of the list display section 102.

A mouse pointer 100A, which is moved on-screen by the mouse, is also displayed in the main screen 100. When the left or right mouse button is single-clicked or double-clicked, the music player executes a function appropriate for the location of the on-screen mouse pointer 100A (e.g., button, icon, or character string).

A plurality of operating buttons 101A for entering various operations, for instance, for music reproduction and skipping, are displayed in the toolbar 101. The displayed operating buttons 101A vary depending on the operation of the music player.

The list display section 102 contains song text 102A that is displayed and arranged in a vertical direction to convey information (five pieces of information) about individual songs stored on the hard disk drive 6. From left to right, the song text 102A in each line includes a track name (song name) 102B, time (song length) 102C, an artist name 102D, an album name 102E, and a genre 102F.

The rightmost edge of the list display section 102 is provided with a scroll bar 102G. When a scroll pointer 102H is vertically dragged with the mouse pointer 100A, the contents of the list display section 102 are vertically scrolled to display hidden song text 102A.

The music player reproduces a desired song when the user places the mouse pointer 100A over the song text 102A for the desired song within the list display section 102 and double-clicks the left mouse button on it (hereinafter referred to as "double-clicking a song"). The music player also reproduces the desired song when the user selects the desired song by single-clicking the left mouse button on its song text 102A (hereinafter referred to as "left-clicking a song") and then clicks a reproduction button in the toolbar.

Playlist icons 103A are displayed in the playlist display section 103 to represent playlists for reproducing a plurality of songs.

The user can select a desired song from a plurality of pieces of song text 102A, which serve as candidate objects displayed in the list display section 102, and register the selected song in an existing playlist as a selected object or create a new playlist. The user can also delete registered songs from an existing playlist.

When a reproduction procedure is performed with a desired playlist selected, the music player sequentially reproduces only the songs registered in the playlist. The music player is provided in advance with an "ALL" playlist, which includes all songs as registered songs. The "ALL" playlist enables the user to exercise a playlist function without creating a playlist.

(2-3) The Three-Dimensional Structure of List Display Section

As described above, the list display section 102 permits the user to select desired songs and register them in a playlist.

A list display method in related art displays selected objects by user in a different manner so that the selected objects are visually differentiated from the candidate objects. When the list display section is scrolled, the selected objects are scrolled off the screen together with the candidate objects. Therefore, the selected objects are no longer visible.

On the other hand, the list display method according to an embodiment of the present invention uses the three-dimensional display mode in which the candidate objects and selected objects are displayed in different display layers. Consequently, the candidate objects and selected objects are separately displayed within the same screen so that both objects are constantly visible.

The music player, configured to as a candidate object display section, displays the song text 102A for the candidate objects in a rear hierarchical layer of a virtual hierarchical display structure of the list display section 102. The rear hierarchical layer is referred to as the 2D layer. Further, the music player, which also serves as a selected object display section, displays the selected objects, which are selected from the song text 102A for the candidate objects, in a front hierarchical layer of the virtual hierarchical display structure of the list display section 102. The front hierarchical layer is referred to as the 3D layer.

As described above, a plurality of hierarchical display layers are set in a superposing manner from the front to rear of the same screen, that is, in the direction of a user's sight line, and the display styles of objects displayed in the hierarchical display layers are changed in compliance with user instructions concerning the individual hierarchical display layers that are set.

The procedure for displaying and selecting the above three-dimensionally displayed objects will now be described with reference to a display example of the main screen 100 and a timing diagram shown in FIG. 7.

Figure 4:
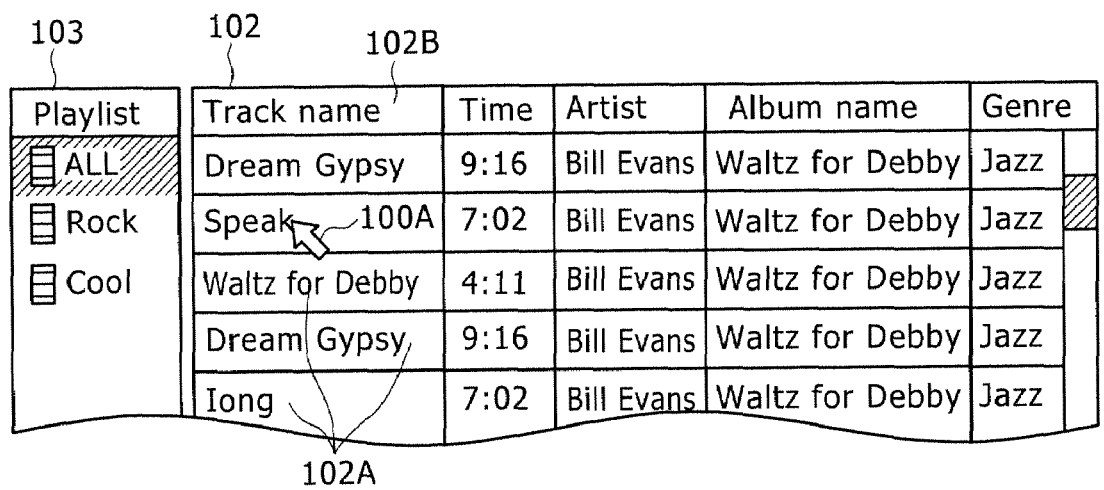
FIG. 4 is a schematic diagram illustrating a playlist creation procedure.

When a desired song is to be selected from a plurality of pieces of song text 102A displayed in the list display section 102 and registered in a playlist as a registered song, the user uses the mouse pointer 100A as indicated in FIG. 4 and selects the desired song by single-clicking the right mouse button on its song text 102A (hereinafter simply referred to as "right-clicking on a song").

Figure 7:
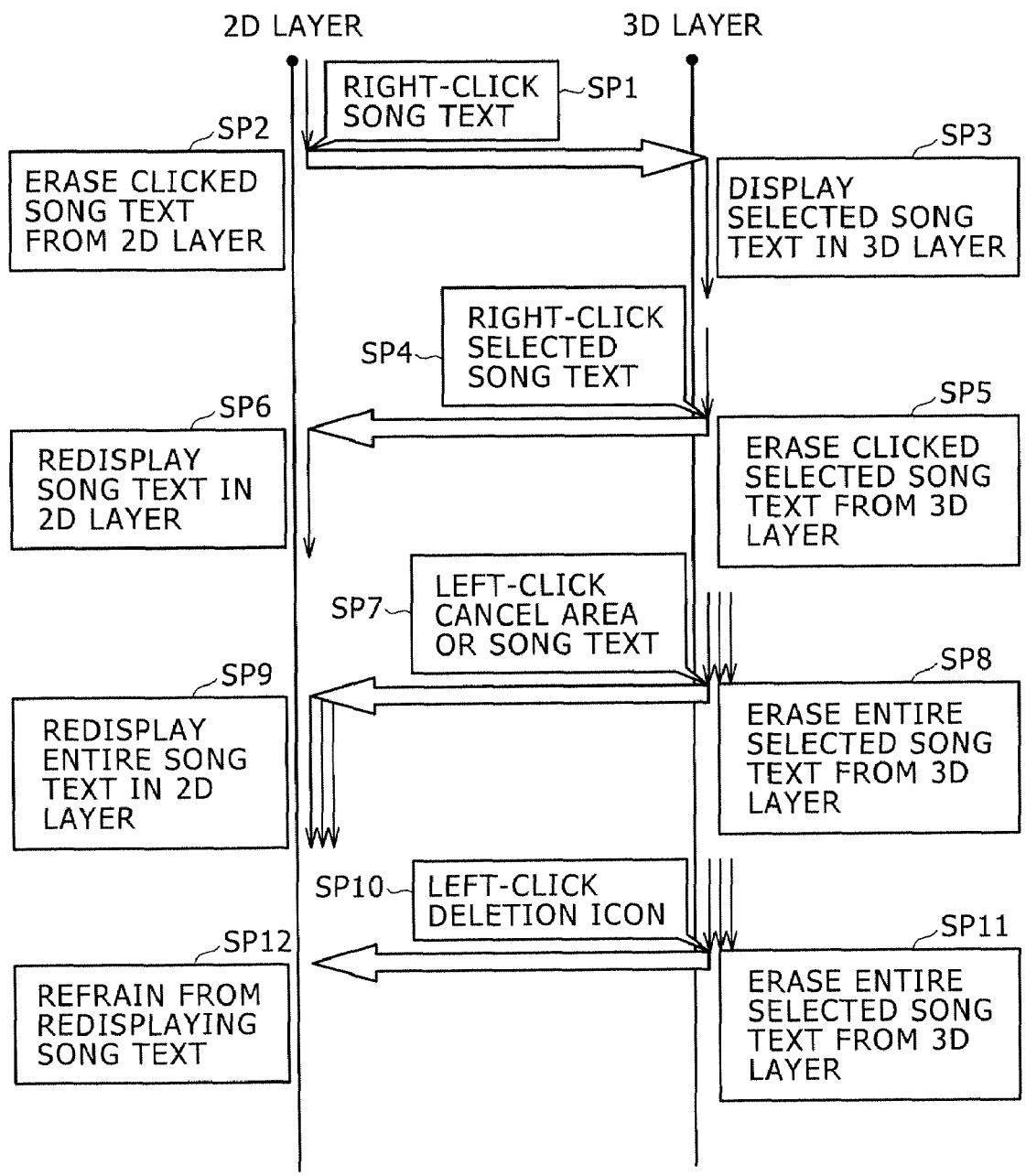
FIG. 7 is a timing diagram illustrating a song selection/deselection/deletion procedure.

When the "right-clicking on a song" operation is detected (FIG. 7, step SP1), the music player erases the selected song text 102A from the 2D layer as indicated in FIG. 5 (FIG. 7, step SP2) and displays a character string having the same contents as the erased song text in the 3D layer, which is positioned in front of the 2D layer in which the song text 102A is displayed, as selected song text 110 for the selected song (FIG. 7, step SP3). Consequently, the selected song text 102A is moved from the 2D layer to the 3D layer as the selected song text 110.

In this instance, the music player displays the selected song text 110 so that the displayed selected song text 110 is slightly displaced from its original display position of the song text 102A, and oscillates the selected song text 110 gently in both vertical and horizontal directions. This causes the user to recognize that the selected song text 110 is floating above the other song text 102A due to the use of the three-dimensional display mode. The user is also compelled to recognize that the selected song text 110 is waiting for the user's next operation. In the above instance, the selected song text 110 may oscillate at a low speed and at a small amplitude so that the user can recognize that the selected song text 110 is displayed in front of the other song text 102A.

In the above instance, the music player displays the selected song text 110 and also displays a new playlist creation icon 103B, which creates a new playlist, and a deletion icon 103C, which deletes the selected song, in the 2D layer of the playlist display section 103.

The song selection procedure described above can be repeated any number of times. Each time a new song is selected by right-clicking on it, the associated selected song text 110 is displayed in the 3D layer. In this instance, the display position of the selected song text 110 in the 3D layer can be changed as desired by dragging the selected song text 110 with the mouse pointer 100A.

(2-4) 3D Layer Display During Scrolling

If there are too many pieces of song text 102A, which are selectable objects, so that the entire song text 102A does not fit into the display region of the list display section 102, the contents displayed in the list display section 102 can be vertically scrolled by dragging the scroll pointer 102H with the mouse pointer 101A as described earlier. This makes it possible to display hidden song text 102A.

When the above scrolling operation is performed, the music player scrolls only the song text 102A displayed in the 2D layer and does not move the selected song text 110 displayed in the 3D layer, which is positioned in front of the 2D layer.

If, for instance, the scroll pointer 102H is dragged downward as shown in FIG. 6, the song text 102A displayed in the 2D layer scrolls upward; however, the selected song text 110 displayed in the 3D layer remains unaffected by scrolling and stays put. In this manner, the music player uses a 3D display mode to constantly display the selected song text 110, which represents the selected objects.

(2-5) Selecting, Deselecting, or Deleting Selectable Song Text

The selected song text 110, which is selected as described above, can be deselected on an individual song basis or entirely deselected.

When the selected song text 110 is to be deselected on an individual song basis, the user uses the mouse pointer 100A and right-clicks a desired piece of selected song text 110. When the above "right-clicking a desired piece of selected song text" operation is detected (FIG. 7, step SP4), the music player erases the associated selected song text 110 from the 3D layer (FIG. 7, step SP5) and redisplays the original song text 102A for the selected song text 110 in the 2D layer (FIG. 7, step SP6). Consequently, the selected song text 110 reverts to the song text 102A and is moved from the 3D layer to the 2D layer. This song deselection procedure can be repeated any number of times as far as the selected song text 110 is displayed in the 3D layer.

When the selected song text 110 is to be entirely deselected, the user uses the mouse pointer 100A and left-clicks a cancel area, which is an unoccupied area in the playlist display section 103 where no icon is displayed, or left-clicks unselected song text 102A.

When the "left-clicking the cancel area" operation or "left-clicking unselected song text" operation is detected (FIG. 7, step SP7), the music player erases the entire selected song text 110 from the 3D layer (FIG. 7, step SP8) and redisplays the original song text 102A for the selected song text 110 in the 2D layer (FIG. 7, step SP9). When the selected song text 110 is entirely deselected, the music player erases the new playlist creation icon 103B and deletion icon 103C from the 2D layer of the playlist display section 103.

Further, when the deletion icon 103C is left-clicked while the selected song text 110 is displayed, the original song text 102A for the selected song text 110 is deleted from the list display section 102.

When the above "left-clicking the deletion icon" operation is detected (FIG. 7, step SP10), the music player erases the entire selected song text 110 from the 3D layer (FIG. 7, step SP11) and entirely erases the song text 102A corresponding to the selected song text 110 from the 2D layer (FIG. 7, step SP12).

(2-6) Registering Selected Song Text in a Playlist

The selected song text 110, which is selected as described above, can be registered in a new playlist as registered songs or added to an existing playlist as registered songs.

Figure 8:
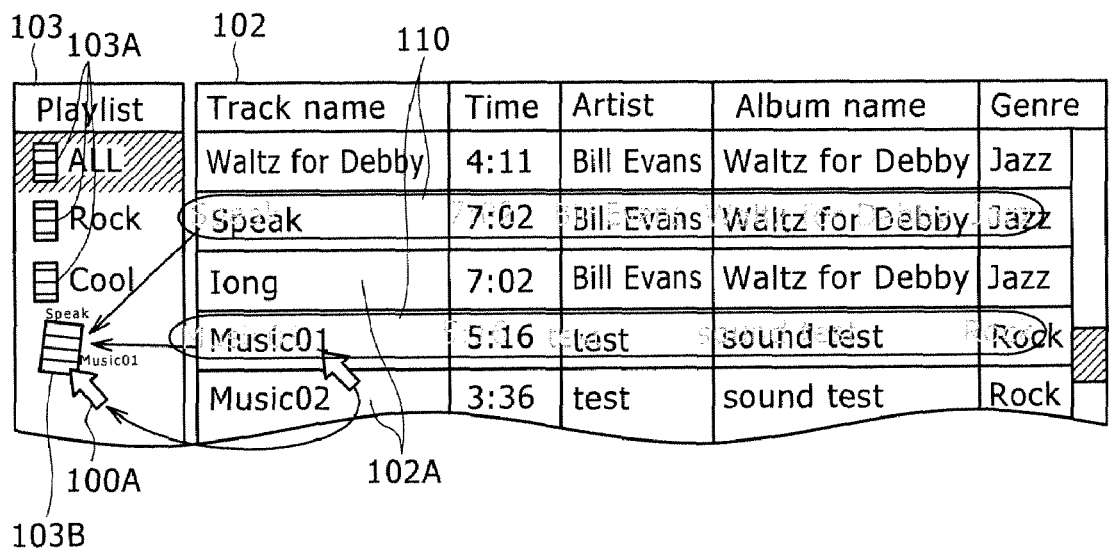
FIG. 8 is a schematic diagram illustrating a playlist creation procedure.

First of all, the procedure for registering the selected song text 110 in a new playlist will be described. In this case, while desired selected song text 110 is selected and displayed in the 3D layer, the user uses the mouse pointer 100A and left-clicks the new playlist creation icon 103B displayed in the 2D layer of the playlist display section 103 (FIG. 8).

Figure 9:
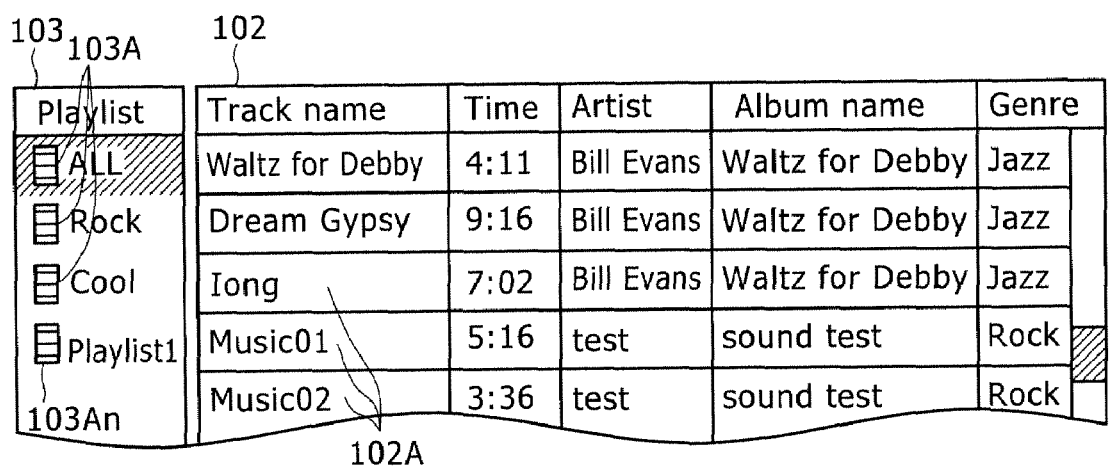
FIG. 9 is a schematic diagram illustrating a playlist creation procedure.
Figure 11:
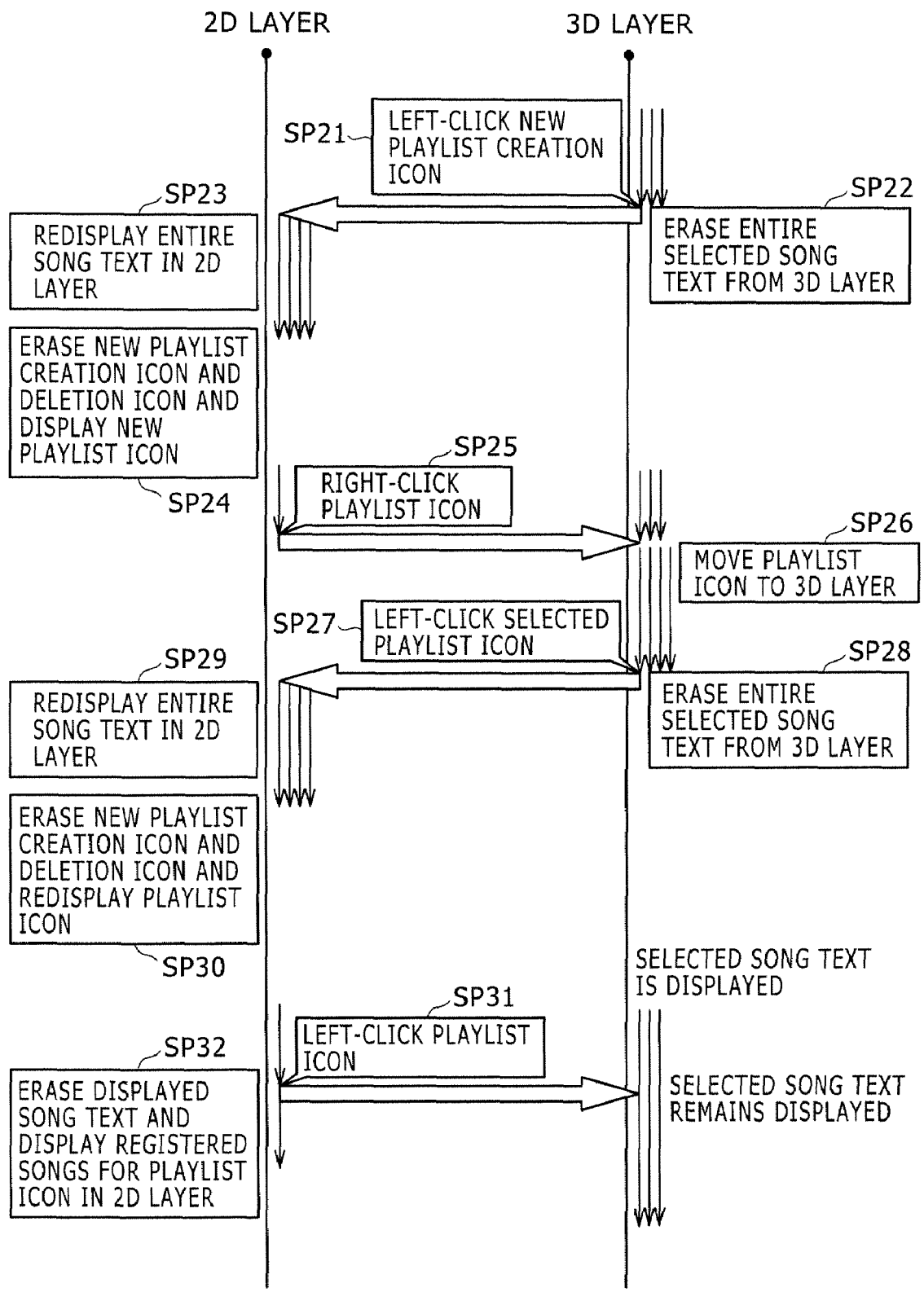
FIG. 11 is a schematic diagram illustrating a playlist operation procedure.

When the "left-clicking the new playlist creation icon" operation is detected (FIG. 11, step SP21), the music player erases the entire selected song text 110 from the 3D layer as indicated in FIG. 9 (FIG. 11, step SP22) and redisplays the original song text 102A for the selected song text 110 in the 2D layer (FIG. 11, step SP23). Further, the music player erases the new playlist creation icon 103B and deletion icon 103C from the 2D layer of the playlist display section 103, creates a new playlist icon 103An, displays it in the 2D layer of the playlist display section 103 (FIG. 11, step SP24), and performs a process for collectively registering the entire selected song text 110, which is displayed in the 3D layer, as registered songs for the new playlist icon 103An.

The procedure for additionally registering selected song text 110 in an existing playlist will now be described. In this case, while desired selected song text 110 is selected and displayed in the 3D layer, the user uses the mouse pointer 100A, right-clicks a playlist icon 103A for additional registration to select a 3D mode, and left-clicks the playlist icon 103A.

When the "right-clicking a playlist icon" operation is detected (FIG. 11, step SP25), the music player moves the playlist icon 103A for additional registration to the 3D layer and displays it as a selected playlist icon 103S (FIG. 11, step SP26) as indicated in FIG. 10.

When the "left-clicking the selected playlist icon" operation is detected (FIG. 11, step SP27), the music player erases the entire selected song text 110 from the 3D layer (FIG. 11, step SP28) and redisplays the original song text 102A for the selected song text 110 in the 2D layer (FIG. 11, step SP29). Further, the music player erases the new playlist creation icon 103B and deletion icon 103C from the 2D layer of the playlist display section 103, moves the selected playlist icon 103S to the 2D layer, redisplays it as an original playlist icon 103A (FIG. 11, step SP30), and registers the entire selected song text 110 displayed in the 3D layer as registered songs for the playlist icon 103A.

(2-7) Maintaining the 3D Layer Display Status at the Time of a List Display Section Display Change Further, the contents displayed in the 3D layer of the list display section 102 are maintained without regard to a change in the contents displayed in the 2D layer of the list display section.

When, for instance, the playlist icon 103B displayed in the 2D layer of the playlist display section 103 is left-clicked, the music player detects the "left-clicking the playlist icon" operation (FIG. 11, step SP31), erases the song text 102A from the list display section 102, and displays the songs registered for the left-clicked playlist icon 103B in the 2D layer of the list display section 102 as song text 102A in the form of a list (FIG. 11, step SP32). In this instance, the music player maintains the display status of the selected song text 110 displayed in the 3D layer of the playlist display section 103.

Consequently, the user can sequentially switch to display the songs registered in a desired playlist in the list display section 102 while maintaining the selected state of the selected song text 110.

(3) Operations and Advantages

The music player, which is configured as described above, displays the song text 102A, which represents the user-selectable candidates, in the 2D layer of the list display section 102.

When particular song text 102A is selected by the user, the music player moves it from the 2D layer to the 3D layer, which is positioned in front of the 2D layer, and displays it as selected song text 110.

The 2D layer and 3D layer are set as different display hierarchical layers. Therefore, when a user instruction is input in relation to the 2D layer, only the display style of the 2D layer changes, and the display style of the 3D layer remains unchanged without regard to the user instruction. When, for instance, the song text 102A displayed in the 2D layer is scrolled, the selected song text 110 displayed in the 3D layer remains unaffected by scrolling and stays put. This enables the user to perform an operation while constantly confirming the song text 110 selected by user.

When the playlist icon 103A is left-clicked while the selected song text 110 is displayed in the 3D layer as shown in FIG. 9, the music player displays the song text 102A for the songs registered for the playlist icon 103A in the 2D layer of the list display section 102.

As described above, even when the contents displayed in the 2D layer are changed, the selected song text 110 displayed in the 3D layer remains unaffected by such a change and stays put. This enables the user to perform an operation while constantly confirming the song text 110 selected by user.

As mentioned earlier, the 2D layer and 3D layer are set as different display hierarchical layers. Therefore, when a user instruction is input in relation to the 3D layer, only the display style of the 3D layer changes, and the display style of the 2D layer remains unchanged without regard to the user instruction. When, for instance, the selected song text 110 displayed in the 3D layer is dragged with the mouse pointer 100A, the music player changes the display position of the selected song text 110 in the 3D layer, but the song text 102A displayed in the 2D layer remains unaffected by such a change and stays put. This enables the user to freely move the selected song text 110, which is displayed over the song text 102A, and perform an operation while confirming the song text 102A, which is displayed in the lower layer.

When user instructions are input for the 2D and 3D layers, the display styles of the 2D and 3D layers are changed respectively. When, for instance, the selected playlist icon 103S displayed in the 3D layer is left-clicked as shown in FIG. 10, the music player erases the selected playlist icon 103S from the 3D layer and redisplays its original playlist icon 103A in the 2D layer. Further, the music player additionally registers the entire selected song text 110 displayed in the playlist display section 103 as registered songs for the playlist icon 103A, and erases the selected song text 110 from the 3D layer. The music player then displays the song text 102A for the songs registered for the playlist icon 103A in the 2D layer of the list display section 102.

The use of the above configuration makes it possible to display the selected song text 110, which represents selected objects by user, in a layer different from the layer for the song text 102A, which represents selectable candidate objects, thereby providing increased ease of object selection operation.

(4) Other Embodiments

The embodiment described above uses two different layers: 2D layer for displaying candidate objects and 3D layer for displaying selected objects. However, the present invention is not limited to the use of two different layers. Alternatively, three or more layers may be used for information display purposes. For example, enhanced ease of object selection operation is provided if reselected objects, which are selected from selected objects, are displayed in a new layer or if objects selected from candidate objects are displayed in different user-specified layers.

The embodiment described above assumes that the present invention is applied to a list display screen of the music player, which reproduces musical content. However, the present invention may also be applied to various other list display screens such as a display screen for a file management program and file selection screens for various programs.

The embodiment described above assumes that a mouse is employed as a device for inputting various selection commands and used to perform selection and deselection procedures, for instance, by right-clicking, left-clicking, or double-clicking the mouse. However, the present invention is not limited to the use of the mouse as an input device. Alternatively, various other input devices such as a keyboard, trackball, or touch panel may be used to input the various selection commands.

The embodiment described above assumes that the CPU 2 of the personal computer 1 executes the music player program as an information display program to implement the list display method according to an embodiment of the present invention. However, the present invention is not limited to the use of such a configuration. Alternatively, various other circuit configurations may be used to implement the list display method according to an embodiment of the present invention.

The embodiment described above assumes that the CPU 2 of the personal computer 1 executes the music player program as an information display program to implement the list display method according to an embodiment of the present invention. However, the present invention is not limited to the use of such a configuration. An alternative is to install the information display program on the personal computer 1 via a CD-ROM (Compact Disc Read Only Memory), DVD (Digital Versatile Disc), semiconductor memory, or other storage medium on which the information display program is stored, and implement the above list display method.

It should be understood by those skilled in the art that various modifications, combinations, sub-combinations, and alterations may occur depending on designs and other factors insofar as they are within the scope of the appended claims or the equivalents thereof.

What is claimed is:

1. An information display apparatus comprising:
    means for displaying selectable candidate objects in a first display layer on a display; and
    means for displaying a selected object, which is selected from the candidate objects, in a second display layer on the display, which is superposed over the first display layer,
    wherein, when a scrolling operation is input, the means for displaying selectable candidate objects scrolls the candidate objects displayed in the first display layer in accordance with the scrolling operation, and the means for displaying a selected object continuously displays the selected object in the second display layer at a same position without regard to the scrolling operation.

2. The information display apparatus according to claim 1, further comprising:
    means for determining whether an input operation is performed in relation to the first display layer and/or the second display layer, wherein the means for displaying selectable candidate objects and the means for displaying a selected object exercise display control over the first display layer and/or the second display layer in accordance with the operation type determined by the means for determining.

3. The information display apparatus according to claim 2, wherein, when the means for determining determines that an input operation is performed in relation to the first display layer, the means for displaying a selected object maintains the display status of selected object in the second display layer.

4. The information display apparatus according to claim 1, wherein the means for displaying a selected object displays the second display layer in front of the first display layer on the display.

5. The information display apparatus according to claim 1, wherein the means for displaying a selected object displays the selected object in the second display layer in a manner different from the manner in which the candidate objects are displayed in the first display layer.

6. The information display apparatus according to claim 1, wherein, when a predefined collective processing operation is performed in relation to the second display layer, the means for displaying a selected object performs a predefined collective process on all selected objects displayed in the second display layer.

7. The information display apparatus according to claim 6, wherein the means for displaying a selected object displays an icon for entering the predefined collective processing operation.

8. The information display apparatus according to claim 1, wherein the means for displaying selectable candidate objects scrolls the candidate objects displayed in the first layer vertically on the display in accordance with the scrolling operation, and
the means for displaying a selected object continuously displays the selected object in the second display layer at the same position without regard to the vertical scrolling operation of the candidate objects displayed in the first display layer on the display.

9. An information display method comprising:
displaying selectable candidate objects in a first display layer on a display;
displaying a selected object, which is selected from the candidate objects, in a second display layer on the display, which is superposed over the first display layer;
scrolling the candidate objects displayed in the first display layer in accordance with a scrolling operation, when the scrolling operation is input; and
continuously displaying a selected object in the second display layer at a same position without regard to the scrolling operation.

10. An information display method of claim 9, wherein scrolling the candidate objects displayed in the first display layer in accordance with a scrolling operation includes scrolling the candidate objects vertically on the display when the scrolling operation is input; and
continuously displaying a selected object in the second display layer includes continuously displaying the selected object at the same position without regard to the vertical scrolling operation of the candidate objects displayed in the first display layer on the display.

11. A tangible computer-readable medium including an information display program, which when executed by an information processing apparatus causes the information processing apparatus to perform a process comprising:
displaying selectable candidate objects in a first display layer on a display;
displaying a selected object, which is selected from the candidate objects, in a second display layer on the display, which is superposed over the first display layer;
scrolling the candidate objects displayed in the first display layer in accordance with a scrolling operation, when the scrolling operation is input; and
continuously displaying a selected object in the second display layer at a same position without regard to the scrolling operation.

12. The tangible computer-readable medium according to claim 11, wherein scrolling the candidate objects displayed in the first display layer in accordance with a scrolling operation includes scrolling the candidate objects vertically on the display when the scrolling operation is input; and
continuously displaying a selected object in the second display layer includes continuously displaying the selected object at the same position without regard to the vertical scrolling operation of the candidate objects displayed in the first display layer on the display.

13. A graphical user interface that presents selectable candidate objects and allows a user to select an object from the candidate objects, the graphical user interface comprising:
a display configured to display the candidate objects in a first display layer and display a selected object, which is selected from the candidate objects, in a second display layer, which is superposed over the first display layer; and
a processor configured to scroll the candidate objects displayed in the first display layer in accordance with a scrolling operation, when the scrolling operation is input, and continuously display a selected object in the second display layer at a same position without regard to the scrolling operation.

14. The graphical user interface of claim 13, wherein the processor is configured to scroll the candidate objects displayed in the first display layer vertically in accordance with the scrolling operation, and continuously display the selected object in the second display layer at a same position without regard to the vertical scrolling operation of the candidate objects displayed in the first display layer.

15. A music reproduction apparatus comprising:
means for displaying selectable candidate objects in a first display layer on a display;
means for displaying a selected object, which is selected from the candidate objects, in a second display layer on the display, which is superposed over the first display layer, wherein
when a scrolling operation is input, the means for displaying selectable candidate objects scrolls the candidate objects displayed in the first display layer in accordance with the scrolling operation, and the means for displaying a selected object continuously displays the selected object in the second display layer at a same position without regard to the scrolling operation;
means for creating a playlist in accordance with selected objects displayed in the second display layer; and
means for reproducing music in accordance with the playlist.

16. A tangible computer-readable medium including a music reproduction program, which when executed by a music reproduction apparatus, causes the music reproduction apparatus to perform a method comprising:
displaying selectable candidate objects in a first display layer;
displaying a selected object, which is selected from the candidate objects, in a second display layer, which is superposed over the first display layer;

scrolling the candidate objects displayed in the first display layer in accordance with a scrolling operation, when the scrolling operation is input;

continuously displaying a selected object in the second display layer at a same position without regard to the scrolling operation;

creating a playlist in accordance with selected objects displayed in the second display layer; and reproducing music in accordance with the playlist.

17. An information display apparatus comprising:

a display configured to display selectable candidate objects in a first display layer, and a selected object, which is selected from the candidate objects, in a second display layer, which is superposed over the first display layer; and a processor configured to scroll the candidate objects displayed in the first display layer in accordance with a scrolling operation, when the scrolling operation is input, and continuously display a selected object in the second display layer at a same position without regard to the scrolling operation.

18. A music reproduction apparatus comprising:

a display configured to display selectable candidate objects in a first display layer, and display a selected object, which is selected from the candidate objects, in a second display layer, which is superposed over the first display layer;

a processor configured to scroll the candidate objects displayed in the first display layer in accordance with a scrolling operation, when the scrolling operation is input, continuously display a selected object in the second display layer at a same position without regard to the scrolling operation, and create a playlist in accordance with selected objects displayed in the second display layer; and a reproduction section that includes a speaker and is configured to reproduce music in accordance with the playlist.

19. The music reproduction apparatus according to claim 18, wherein the processor is configured to scroll the candidate objects displayed in the first display layer vertically in accordance with the scrolling operation, and continuously display the selected object in the second display layer at a same position without regard to the vertical scrolling operation of the candidate objects displayed in the first display layer.

* * * * *